United States Patent [19]
Shelstad

[11] 3,861,324
[45] Jan. 21, 1975

[54] CONVEYOR ASSEMBLY
[76] Inventor: Richard J. Shelstad, 4104 W. Haven Ave., Mequon, Wis. 53092
[22] Filed: May 21, 1973
[21] Appl. No.: 362,527

[52] U.S. Cl. ............................. 104/172 B, 198/170
[51] Int. Cl. ........................................... B65g 17/38
[58] Field of Search ..................... 104/162, 172 B; 198/170–172

[56] References Cited
UNITED STATES PATENTS

| 1,686,567 | 9/1928 | Levin | 198/171 X |
| 2,676,696 | 4/1954 | Gerhartz | 198/171 X |
| 3,329,255 | 7/1967 | Dulieu | 198/170 |
| 3,511,187 | 5/1970 | Hanna | 104/172 B |
| 3,596,606 | 8/1971 | Smith et al. | 104/172 B |
| 3,719,151 | 3/1973 | Andersen | 104/172 B |
| 3,744,433 | 7/1973 | Bernardi | 104/172 B |

Primary Examiner—M. Henson Wood, Jr.
Assistant Examiner—Andres Kashnikow
Attorney, Agent, or Firm—Michael, Best & Friedrich

[57] ABSTRACT

A conveyor assembly for moving a vehicle along a path of travel, such as through the bay of a vehicle washing installation, including an endless, horizontally disposed conveyor chain mounted above the floor and a plurality of puller units carried by carriages mounted at spaced locations on the conveyor chain. Each puller unit includes a horizontal extending roller for engaging the rear portion of one of the vehicle wheels and is pivotally mounted on a carriage for pivotal movement relative to the carriage, about both a horizontal axis and a vertical axis, between an extended position where the roller extends generally perpendicular to the travel path and a retracted position where the roller extends generally parallel to the travel path. As a safety feature, each puller unit is releasably locked in the extended position by a locking mechanism on the respective carriage which, in the event the roller engages a person's foot or similar obstruction, releases the puller unit so it can pivot to the retracted position.

In one embodiment, an actuator unit is provided near the entrance of the assembly for selectively moving the puller units from the retracted position to the extended position and a mechanism is provided near the exit end of the assembly for unlocking the puller units and moving them to the retracted position so that the assembly can be operated on an on-demand basis.

12 Claims, 11 Drawing Figures

CONVEYOR ASSEMBLY

BACKGROUND OF THE INVENTION

This invention relates to conveyors and, more particularly, to conveyors for moving vehicles, such as automobiles and the like, along a predetermined path of movement, such as through a car wash line.

Various types of conveyor systems have been used for moving vehicles along a predetermined path through washing units or the like. One type of prior art conveyor system employs pull chains which are hooked to the vehicle for towing. In addition to requiring manual connection and disconnection of the pull chains, this type of conveyor system is usually quite complicated and cumbersome, requires a trench or pit to accommodate some mechanisms, and is difficult to operate and maintain.

So-called "hookless" conveyor systems have been developed in an effort to overcome some of these disadvantages. These conveyors typically employ one or more puller units which are connected to a continuous chain and which engage the rear portion of a wheel to pull the vehicle forwardly. Examples of such conveyor systems are described in U.S. Pat. Nos. 3,260,219 (Vani) and 3,196,806 (Brunder).

Although effective for eliminating the requirement for manual connection and disconnection of the vehicle, such prior art "hookless" conveyors have one or more shortcomings. For instance, many still require a pit or trench of some type for housing various mechanisms, which of course necessitates substantial modification to an existing structure or additional construction cost for a new installation. The puller members typically employ a horizontally extending member, such as a roller, which engages a vehicle wheel and travels above the floor in the vicinity where the attendants working on the vehicle are normally standing or moving about. Consequently, if an attendant is inadvertently standing in the path of a travelling puller member when a vehicle is not being conveyed, his foot and/or ankle can be seriously injured by the roller. Also, objects can become jammed under a roller and cause substantial damage to the conveyor.

Some prior art devices require the vehicle to be driven over the puller unit roller which causes excessive wear on the puller unit. Also, when the conveyor chain is moving, movement of the vehicles must be coordinated with the travelling puller units to insure proper engagement of the wheel by a puller unit roller.

SUMMARY OF THE INVENTION

An object of this invention is to provide a simple, inexpensive conveyor assembly for moving vehicles or the like along a predetermined path.

Another object of this invention is to provide an above-the-floor conveyor assembly for conveying vehicles through a wash line and having puller units which retract to a safe position upon engaging a person's foot.

A further object of this invention is to provide an above-the-floor conveyor assembly for conveying vehicles which is arranged so that puller units can be maintained in a safe, retracted position until called for by the operator.

Other objects, aspects and advantages of this invention will become apparent to those skilled in the art upon reviewing the following detailed description, drawings and the appended claims.

This invention provides a conveyor assembly including a continuous conveyor means which is driven through a path, a portion of which is parallel to the path of intended vehicle movement. One or more carriages are mounted on the conveyor means and each carries a puller unit which has a horizontally extending portion for engaging the rear portion of a vehicle wheel to tow the vehicle forwardly. Means are provided for mounting the puller unit on the carriage so that the puller unit can be moved between a first or extended position where the outer portion can engage a vehicle wheel and a second or retracted position remote from the vehicle wheel. Means are also provided for releasably locking the puller unit to the carriage so that, upon the application of a lifting force on the outer portion (such as occurs when a person's foot or similar object is engaged), the puller unit is released and is free to move towards the retracted position, thereby preventing injury or puller unit jamming.

In accordance with one embodiment, the puller units remain in a retracted position until actuated to the extended position by an actuator unit located near the entrance end of the conveyor assembly. The puller units are returned to the retracted position, after completion of vehicle conveyance, by an unlatching mechanism which is located near the exit end of the conveyor assembly and which lifts the puller unit outer portion to release the puller unit from the carriage and then pivots the puller unit to a retracted position during continued forward movement.

Also, in accordance with the invention, the conveyor assembly is arranged so that all components, including the drive mechanisms, are mounted above the floor, thereby eliminating the necessity for a pit or trench.

DESCRIPTION OF THE PREFERRED EMBODIMENTS

Figure 3:
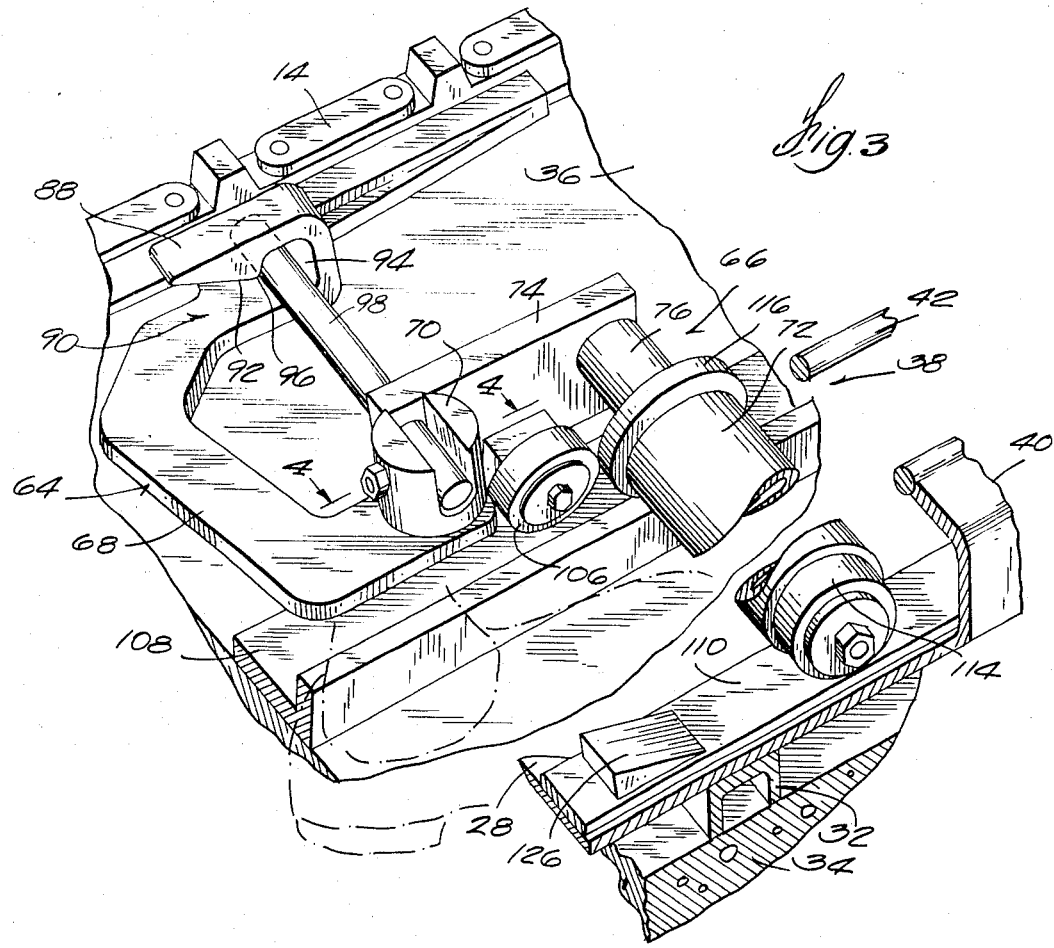
FIG. 3 is a fragmentary, perspective view of the conveyor assembly illustrated in FIG. 1.

Illustrated in the drawings is a conveyor assembly 10 embodying various features of the invention and adapted to move a vehicle along a predetermined travel path (designated by arrow 12 in FIG. 1) such as through the bay of a car washing installation.

Figure 1:
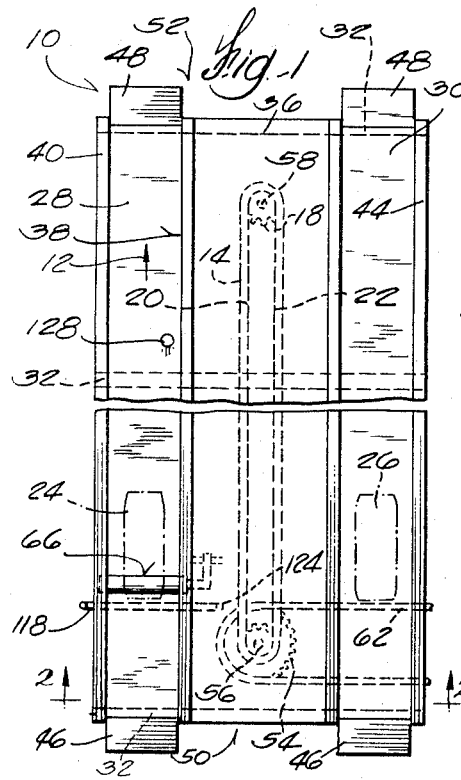
FIG. 1 is a fragmentary, top plan view of a conveyor assembly embodying various of the features of the invention.
Figure 2:
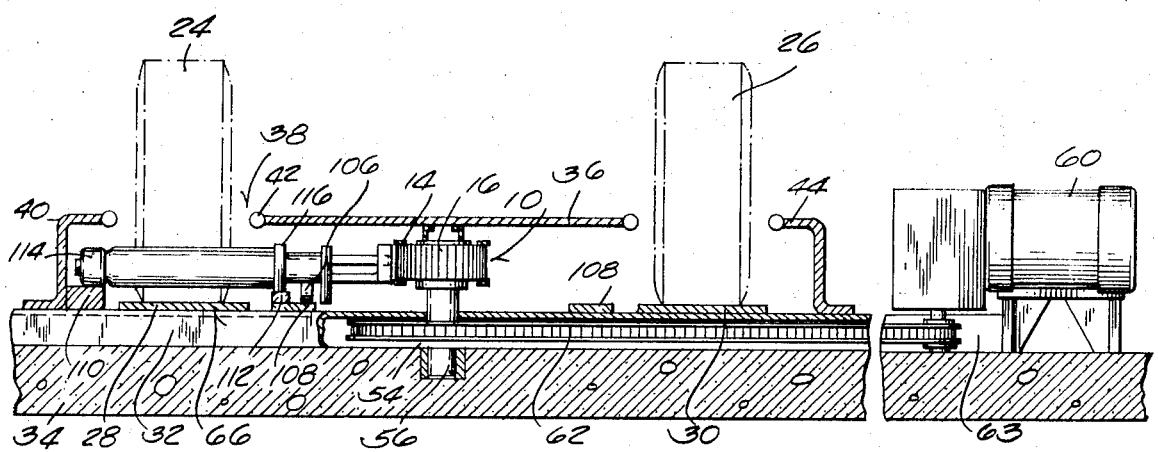
FIG. 2 is a sectional view taken along the plane designated 2—2 in FIG. 1.

Referring to FIGS. 1 and 2, conveyor assembly 10 includes a conveyor drive chain 14 which is trained about a drive sprocket 16 and a take-up or idler sprocket 18 and which, when actuated, moves the vehicle along path 12 as explained below. Drive sprocket 16 and idler sprocket 18 are disposed in a substantially co-planar relationship and are arranged to provide a travel path for drive chain 14 having two substantially parallel, horizontally spaced and oppositely directed passes 20 and 22. Passes 20 and 22 are generally parallel to vehicle travel path 12.

Extending longitudinally and generally adjacent to drive chain passes 20 and 22 for supporting wheels 24 and 26 on the driver and passenger side of the vehicle are respective elongated platforms 28 and 30. Platforms 28 and 30 are supported on a plurality of transversely extending, longitudinally spaced support members 32 which are suitably secured to the surface of the floor 34 and elevate the platforms a small distance above the floor.

Overlying conveyor assembly 10 is a housing 36 which is suitably mounted on support members 32 and generally encloses the conveyor assembly except for one open side 38 which extends parallel to drive chain path 20. A longitudinally extending wheel guide rail 40 located generally adjacent to and extending along the outer edge platform 28 and the top edge 42 of housing 36 are arranged to form a guide channel for generally guiding the left or driver's side vehicle wheel 24 along path 12. If desired, another guide rail 44 can be provided adjacent to the outer edge of platform 30. In order to facilitate movement of the vehicle onto and off platforms 28 and 30, inclined ramps 46 and 48 are respectively provided at the entrance end 50 and the exit end 52 of the platforms.

As best shown in FIG. 2, drive sprocket 16 is coaxially affixed to a larger power sprocket 54. Both of these sprockets are rotatably mounted on a shaft 56 which is suitably affixed, such as by an epoxy adhesive or the like, in a mounting hole provided in floor 34. Idler sprocket 18 is rotatably mounted on a shaft 58 which is suitably mounted on a support means (not shown) supported on floor 34. Drive sprocket 16, and thus drive chain 14, is driven by a suitable power source, such as an electric or hydraulic motor 60, which is operatively connected to power sprocket 54 via a roller chain 62 which extends above the top surface of floor 34 and beneath platform 30. If desired, a suitable housing 63 covering roller chain 62 can be provided as protection for the chain. Also, if desired, the location of the sprockets can be reversed, i.e., the drive and power sprockets located at the exit end of the conveyor assembly and the idler sprocket located at the entrance end.

In the construction illustrated, drive chain 14 is driven clockwise as viewed in FIG. 1. In order to provide a completely surface mounted installation and thereby eliminate the necessity for a pit or trench, shafts 56 and 58 preferably are substantially vertical, with drive sprocket 16 and idler sprocket 18 horizontally disposed thereon, and drive motor 60 is suitably mounted above floor 34.

Figure 5:
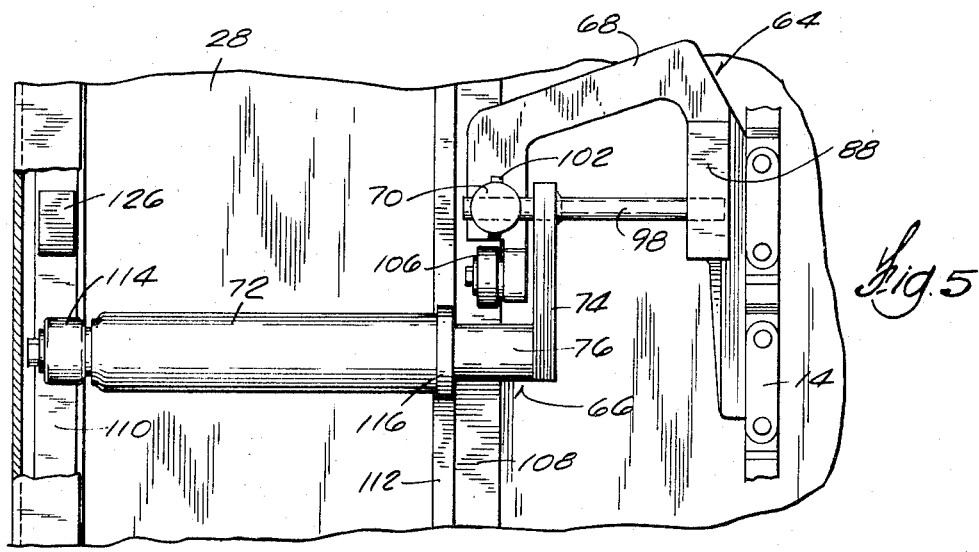
FIG. 5 is a fragmentary, top plan view of the conveyor assembly illustrated in FIG. 1 showing a puller unit in the extended position.

Suitably fastened on drive chain 14 is one or more carriages 64 (See FIGS. 3 and 5) each of which carry a puller unit 66 which in turn includes an outer portion adapted to engage the rear portion of a vehicle wheel and pull the vehicle forwardly when drive chain 14 is actuated.

In accordance with one feature of the invention, each puller unit 66 includes a wheel engaging portion and means are provided for mounting each puller unit 66 on the respective carriage 64 so that puller unit 66 can be moved between a first or extended position where the vehicle wheel can be engaged by the wheel engaging portion and second or retracted position. While various arrangements can be used, in the construction illustrated in FIGS. 1–9, carriage 64 includes a generally horizontally extending support arm 68 which carries a pivot block 70 on the outer portion thereof and puller unit 66 includes a wheel engaging roller 72 rotatably supported on a support bracket 74, such as by an elongated shaft 76 which is affixed at the inner end to support bracket 74 and on which roller 72 is rotatably mounted.

Figure 4:
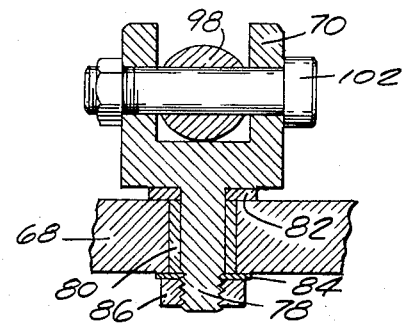
FIG. 4 is a sectional view taken along the plane designated 4—4 in FIG. 3.

As best shown in FIG. 4, pivot block 70 includes a shank 78 rotatably received in a bearing or bushing 80 provided in carriage support arm 68. Pivot block 70 is retained on carriage support arm 68 for relative rotational movement by thrust washers 82, 84 located on the opposite sides of the support arm and a nut 86 threaded onto the outer end of shank 78.

Figure 8:
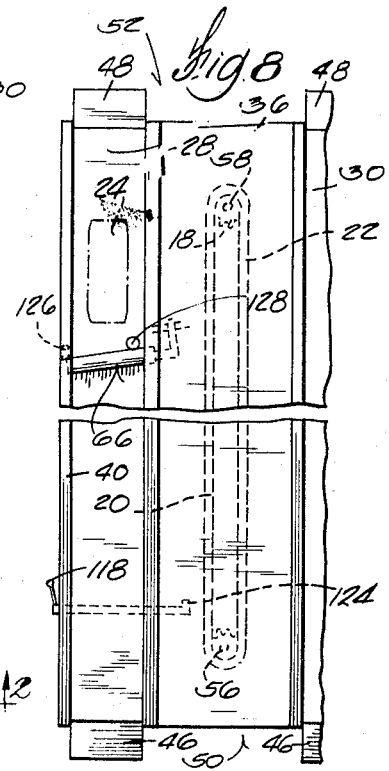
FIGS. 8 and 9 are fragmentary, top plan views of the conveyor assembly illustrated in FIG. 1 showing the respective positions of a puller unit at the completion of vehicle conveyance and after being retracted.
Figure 9:
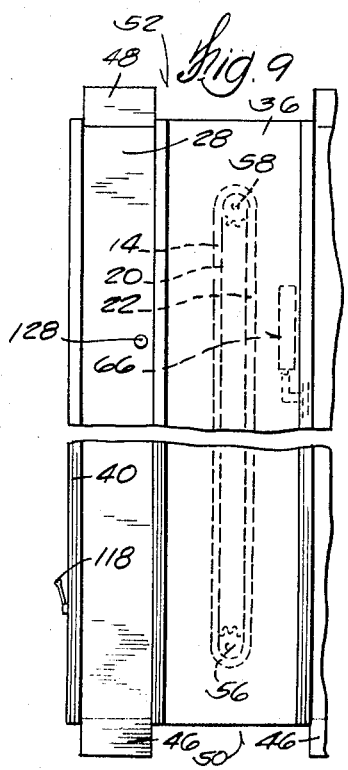
Figure 6:
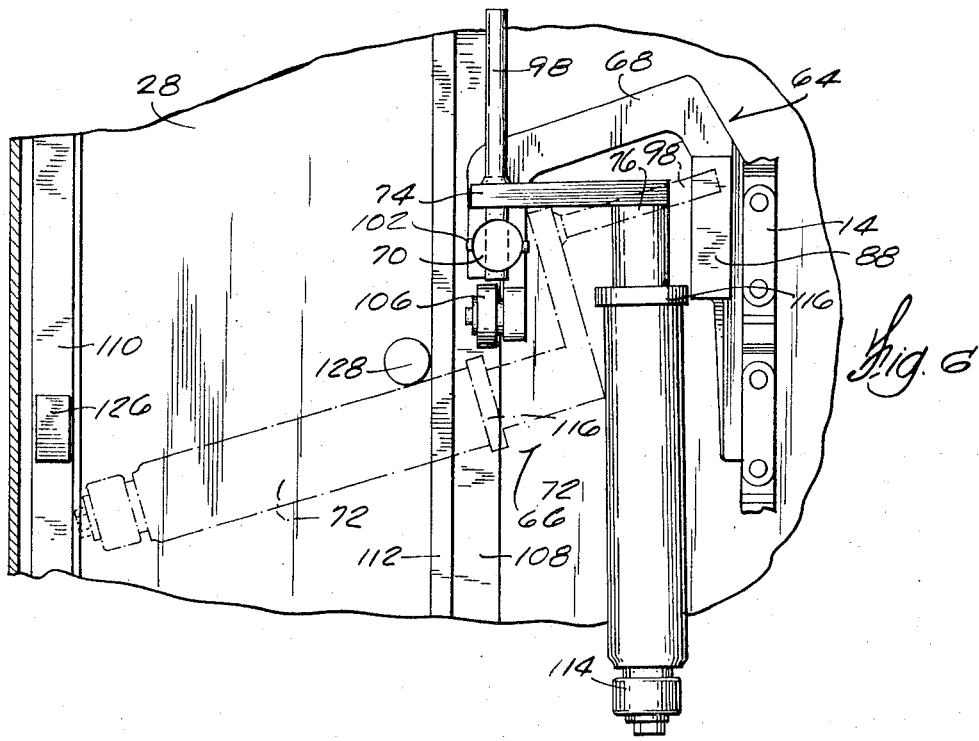
FIG. 6 is a fragmentary, top plan view of the conveyor assembly illustrated in FIG. 1 showing a puller unit being moved towards a retracted position by the unlatching mechanism.
Figure 7:
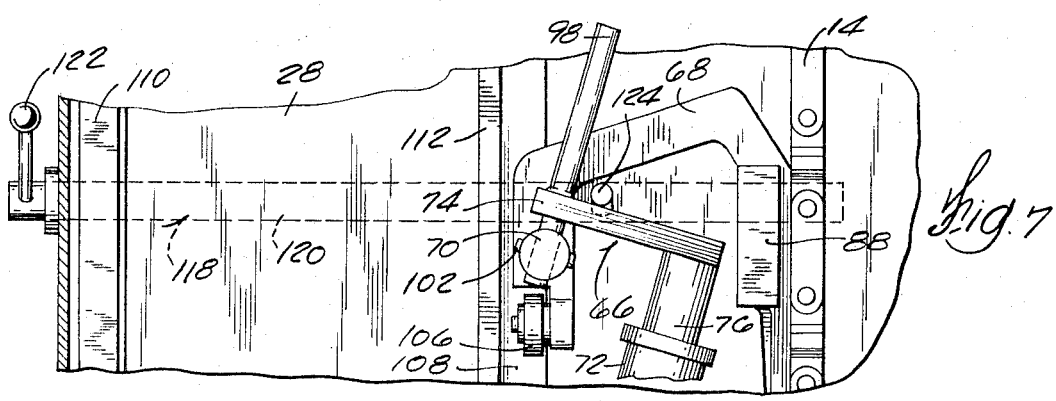
FIG. 7 is a fragmentary, top plan view of the conveyor assembly illustrated in FIG. 1 showing a puller unit being moved from a retracted position towards the extended position by the actuator unit.

Roller support bracket 74 is connected to pivot block 70 so that roller 72 can be pivoted, through a generally horizontal plane about the vertical axis provided by the pivot block shank 78, between an extended position where the roller can engage the rear portion of vehicle wheel 24 (See FIGS. 1 and 4) and retracted position remote from wheel 24 (See FIGS. 6 and 8).

In accordance with another feature of the invention, means are provided for releasably locking puller unit 66 in the extended position such that, upon the application of a lifting force on the wheel engaging portion, the puller unit is released to permit the wheel engaging portion to be moved to the retracted position. While various arrangements can be used, in the construction illustrated, such means includes a locking bracket 88 which is located on the inner end portion of carriage support arm 68 and which includes a forwardly open and rearwardly extending guideway 90 (See FIG. 3). Guideway 90 includes an upper camming surface 92 which inclines rearwardly and downwardly and an enlarged slot portion 94 located rearwardly of camming surface 92. A downwardly projecting detent 96 is provided at the junction between camming surface 92 and enlarged slot 94.

Puller unit 66 includes a flip out bar 98 which extends generally horizontally from opposite sides of roller support bracket 74. The outer end of flip out bar 98 is connected to pivot block 70, such as by a horizontally extending bolt 102, for vertical pivotal movement of the puller unit. The inner end portion of flip out bar 98 is received in guideway 90 for movement therein. When roller 72 is in an extended position the inner end of flip out bar 98 is located in a locked position in the upper portion of enlarged slot 94 and behind detent 96 as shown in FIG. 3.

As a vehicle is being towed by puller unit 66, the downward and rearward force applied to roller 72 by vehicle wheel 24 further urges flip out bar 84 into a locked position. On the other hand, an upward or lifting force applied to roller 72 produces a vertical movement of flip out bar 98, about the horizontal pivot axis provided by pivot block bolt 102, urging the inner end portion of flip out bar 98 downwardly and out of engagement with detent 96. Roller 72 thereafter can be pivoted about the vertical pivot axis provided by pivot block shank 78 towards a retracted position, as shown in FIG. 6. Thus, if roller 72 engages a person's foot (as shown in FIG. 3) or an object on platform 28 which could become jammed under the roller, the roller is lifted upwardly to unlock flip out bar 98 from locking bracket 88 and the roller is free to pivot towards retracted position and thereby clear the foot or object.

In the embodiment illustrated in FIGS. 1–9, conveyor assembly 10 is arranged to operate on an on-demand basis, i.e., the puller units remain in the retracted position throughout their travel around the conveyor path until called for by the operator. When in the retracted position, each puller unit 66 is supported on a small roller wheel 106 which is rotatably mounted on roller support bracket 74. Roller wheel 106 rides along the top surface of a guide means, such as an elongated strip 108, which is spaced outwardly from and is generally parallel to the path of drive chain 14.

Located generally adjacent to and extending longitudinally along the opposite sides of driver's side platform 28 are elongated wear bars or strips 110 and 112. Rotatably mounted on roller support shaft 76 at the opposite ends of roller 72 are wheels 114 and 116 which ride along the top surfaces of wear strips 110 and 112, respectively, when roller 72 is in the extended position. Outer wear strip 110 and outer wheel 112 are preferably arranged so that, when a vehicle is being towed, the outer end of roller 72 is tilted slightly downwardly to enhance the locking action on flip out bar 98 described above. This tilting action can be obtained by making outer wheel 114 smaller than roller 72, as shown in FIG. 2, so that the outer wheel does not normally ride in engagement with the other wear strip 110 when a vehicle is not being towed.

Located near the entrance end 50 of driver side platform 28 for actuating puller unit 72 to the extended position is an actuator unit 118 (See FIG. 6). Actuator unit 118 includes a rotatably mounted shaft 120 extending horizontally beneath platform 28, an actuation lever or handle 122 connected to the outer end of the shaft 120, and a cam follower means 124 located on the inner end portion of shaft 120. When actuation unit 118 is in an inoperative position, roller support bracket 74 of a retracted puller unit 66 passes above shaft 120 without engaging cam follower means 124. When shaft 120 is rotated to an operate position by handle 122, cam follower 124 extends into the path of and engages roller arm bracket 74. During continued forward movement of puller unit 66, the resulting camming action provided by cam follower means 124 rotates roller support bracket 74, and thus roller 72, about pivot block shank 78, as shown in FIG. 6. The inner end portion of flip out bar 98 is guided into guideway 90 along camming surface 92 and is eventually moved to a locked position behind detent 96.

When outer roller wheel 114 rides up an upwardly inclined unlatching member 126 located on strip near exit end 52 (See FIGS. 5 and 6), the outer end of roller 72 is lifted upwardly and the inner end of flip out bar 98 is unlocked from locking bracket 88 as described above. Roller 72 thereafter engages an upstanding member 128 located on platform 28 forwardly of unlatching member 126 and puller unit 66 is moved to the retracted position during continued forward movement of drive chain 14 as shown in FIG. 6. Puller unit 66 thereafter remains in the retracted position and is carried inside housing (See FIG. 9) until actuation unit 118 is moved to the operate position as described above.

In operation, actuation unit handle 122 is normally in an inoperative position and puller unit 66 remains in a retracted position throughout travel with drive chain 14. Thus, roller 72 is in a safe, retracted position where it cannot cause injury to a person standing on platforms 28 and 30 or become jammed with obstructing objects located on the platforms. Also, a car can be driven onto the platforms to a starting position without having to be driven over a roller and without concern of the relative location of a puller unit 66. As shown in FIG. 2, the car straddles housing 36 with either the left front wheel or rear wheel 24 located in a position where it can be engaged by an extended roller. The operator then moves actuation unit handle 118 to an operate position and the next puller unit 66 reaching a location of the actuator unit is urged to the extended position and locked in place by the cam follower means 124 as described above. The car is then towed along path 12 towards the exit end of the platforms by the puller unit. As the puller unit approaches the exit end of the platforms, roller 72 rides up unlatching member 126 to unlock flip out bar 98 from locking bracket 88, then engages upstanding member 128 and is pivoted to the retracted position as described above. The car is then driven off the exit end of the platforms.

Although only a single puller unit is illustrated in the drawings, it should be understood that a series of puller units can be used. The puller units can be uniformly spaced along the length of the guide chain at a distance whereby the cars are conveyed in close proximity to one another so as to maximize the amount of traffic flow through the car wash line (e.g., about 6–8 feet). When maximum traffic flow is desired, actuator unit handle 122 is left in the operate position so that each puller unit is moved into an extended position as it moves by the actuation unit. When a reduced traffic condition exists, the operator can move the actuator handle 122 to an inoperative position, after a puller unit has been extended, so that the following puller unit or units remains in a retracted position.

Figure 10:
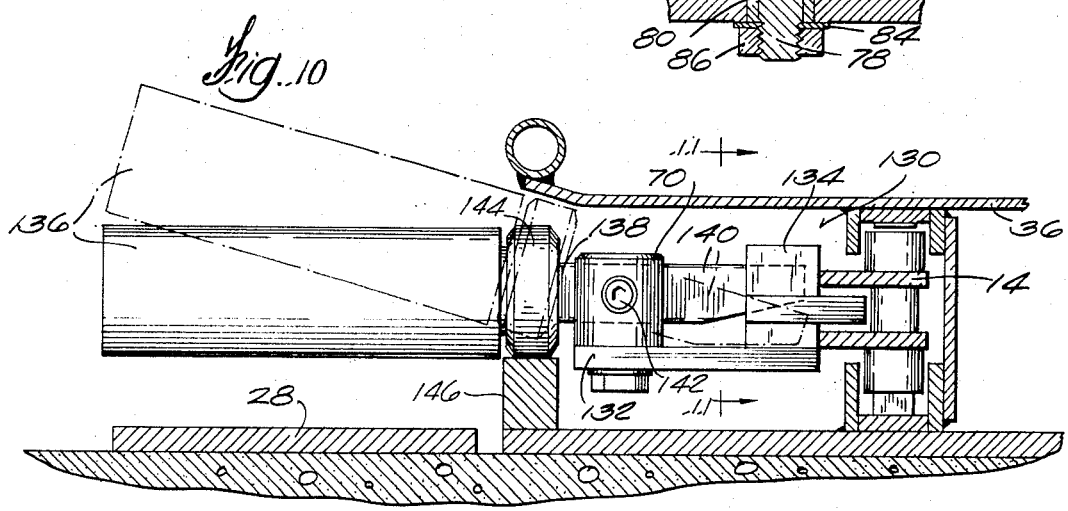
FIG. 10 is a fragmentary, end elevational view, partially sectioned, showing an alternate arrangement for the conveyor assembly.
Figure 11:
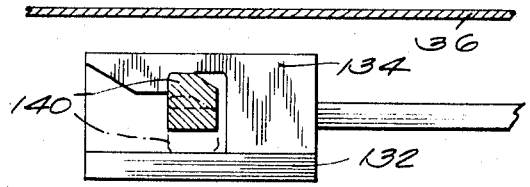
FIG. 11 is a fragmentary sectional view, partially sectioned, taken along the plane designated 11—11 in FIG. 10.

FIGS. 10 and 11 illustrate an alternate embodiment wherein the puller units normally remain in an extended position throughout the entire travel of the conveyor chain. Common reference numerals are used for components which are common with those in the construction illustrated in FIGS. 1–9. In this embodiment, each carriage 130 has a generally horizontally extending support member 132 on which a pivot block 70 is pivotally mounted and a locking bracket 134 including a guideway arranged in the same manner as guideway 90 described above. A wheel engaging roller 136 is rotatably mounted on a support shaft 138 which includes an extension 140. Roller shaft 138 is mounted on pivot block 70 for a vertical pivotal movement of roller 136, such as by a bolt 142. The inner end portion of extension 140 is releasably received in the guideway locking bracket 134 and serves the same function as that of the flip out bar 98 described above. Rotatably mounted on roller support shaft 138 adjacent to the inner end of roller 136 is a wheel 144. Wheel 144 normally rides along the top surface of elongated wear strip 146 which is horizontally spaced from and extends generally parallel to the path of drive chain 14. If roller 136 engages a person's foot or similar object, the resulting lifting force unlocks extension 140 from locking bracket 134 and the roller is free to pivot towards a retracted position to thereby clear the foot or obstruction. A retracted roller is then manually returned to an extended position.

In this embodiment, the outer wear strip can be eliminated. Also, if desired, the wheel support platforms can be eliminated so that the vehicle rides on the floor.

I claim:

1. A conveyor assembly for moving a vehicle along a predetermined travel path comprising:
   a conveyor means,
   means for driving said conveyor means through a continuous path, a portion of the conveyor means path being generally parallel to said travel path;
   at least one carriage carried by said conveyor means,
   a puller unit carrying a generally horizontally extending wheel engaging member for engaging the rear portion of one of the vehicle wheels and pulling the vehicle forwardly along said travel path when said conveyor means is being driven;
   means pivotally mounting said puller unit on said carriage for pivotal movement of said puller unit relative to said carriage, about both a generally horizontal axis and a generally vertical axis, between an extended position where said wheel engaging member extends generally perpendicular to said portion of said conveyor means path for engaging a vehicle wheel and a retracted position where said said wheel engaging member is remotely located from the vehicle wheel and extends generally parallel to said portion of said conveyor means path; and
   means on said carriage for releasably locking said puller unit in said extended position, said locking means being operable to release said puller unit and permit said puller unit to be moved toward said retracted position when a lifting force is applied on said wheel engaging member.

2. A conveyor assembly according to claim 1 wherein said wheel engaging member is an elongated roller; and
   said conveyor assembly includes
   means for rotatably mounting said roller on said puller unit.

3. A conveyor assembly according to claim 2 including
   means for mounting said conveyor means on a floor with the plane of the conveyor means path being generally horizontal and vertically spaced above the floor.

4. A conveyor assembly according to claim 2 wherein said puller unit includes a generally horizontal member which extends toward said conveyor means when said puller unit is in said extended position; and
   said locking means includes a locking bracket on said carriage having a forwardly open and rearwardly extending guideway for receiving the inner end portion of said puller unit member, said guideway having a rearwardly and downwardly inclined camming surface, an enlarged slot portion located behind said camming surface, and a detent located at the juncture of said camming surface and said enlarged slot portion whereby said member inner portion rides along said guideway camming surface and reaches a locked position in said enlarged slot portion behind said detent when said puller unit is moved to said extended position and whereby said member inner portion is moved downwardly from behind said detent and is free to move forwardly through said guideway and thereby permit said puller unit to be moved toward said retracted position when a lifting force is applied on said roller.

5. A conveyor assembly according to claim 2 including
   a wheel located adjacent the inner end of said roller; and
   an elongated guide means which is spaced outwardly from and extends generally parallel to said conveyor means path and on which said wheel rides when said puller unit is in said extended position.

6. A conveyor assembly according to claim 2 including
   an entrance end;
   an exit end;
   actuator means located near said entrance end for selectively moving said puller unit from said retracted position to said extended position; and
   means located near said exit end for unlocking said puller unit from said locking means and moving said puller unit from said extended position to said retracted position.

7. A conveyor assembly according to claim 2 wherein said roller is rotatably mounted on a support bracket; and
   said means for pivotally mounting said puller unit on said carriage includes a pivot block means pivotally mounting said pivot block on said carriage for pivotal movement of said pivot block relative to said carriage about a generally vertical axis, and means pivotally mounting said support bracket on said pivot block for pivotal movement of said support bracket relative to said pivot block about a generally horizontal axis.

8. A conveyor assembly according to claim 6 wherein said puller unit includes a support bracket which carries said roller and which is mounted on said carriage by said pivotal mounting means; and
   said actuator means includes cam follower means adapted to be selectively moved into the path of and engage said support bracket when said puller unit is in said retracted position and thereby move said puller unit to said extended position during continued forward movement of said puller unit.

9. A conveyor assembly according to claim 6 wherein said unlocking means includes an upwardly inclined member over which the outer portion of said roller rides to provide a lifting force for unlocking said puller unit member from said locking means and means located in the path of said roller and forward of said inclined member for engaging said roller and thereby moving said puller unit to said retracted position during continued forward movement of said puller unit.

10. A conveyor assembly for moving a vehicle along a predetermined travel path comprising a conveyor chain, means for driving said conveyor chain through a continuous path, a portion of the conveyor chain path being generally parallel to the intended vehicle travel path;

means for mounting said conveyor chain on a floor with the plane of the conveyor path being generally horizontal and vertically spaced above the floor;

at least one carriage carried by said conveyor chain, a puller unit carrying a generally horizontally extending, elongated roller means rotatably mounted on said puller unit for engaging the rear portion of one of the vehicle wheels and pulling the vehicle forwardly along said travel path when said conveyor chain is being driven;

means pivotally mounting said puller unit on said carriage for pivotal movement of said puller unit relative to said carriage, about both a generally horizontal axis and a generally vertical axis, between an extended position where said roller extends generally perpendicular to said portion of said conveyor path and a retracted position where said roller is remotely spaced from the vehicle wheel and extends generally parallel to said portion of said conveyor path;

a generally horizontal member on said puller unit which extends toward said conveyor chain when said puller unit is in said extended position; and a locking bracket on said carriage having a forwardly open and rearwardly extending guideway for receiving the inner end portion of said puller unit member, said guideway having a rearwardly and downwardly inclined camming surface, an enlarged slot portion located behind said camming surface, and a detent located at the juncture of said camming surface and said enlarged slot portion whereby said member inner portion rides along said guideway camming surface and reaches a locked position in said enlarged slot portion behind said detent, when said puller unit is moved to said extended position, and whereby said member inner portion is moved downwardly from behind said detent and is free to move forwardly through said guideway and thereby permit said puller unit to be moved toward said retracted position, when a lifting force is applied on said roller.

11. A conveyor assembly according to claim 10 wherein said roller is rotatably mounted on a support bracket; and said means for pivotally mounting said puller member on said carriage includes a pivot block, means pivotally mounting said pivot block on said carriage for pivotal movement of said pivot block relative to said carriage about a generally vertical axis, and means pivotally mounting said support bracket on said pivot block for pivotal movement of said support bracket relative to said pivot block about a generally horizontal axis.

12. A conveyor assembly according to claim 11 including an entrance end;

an exit end;

a cam follower means located near said entrance end and adapted to be selectively moved into the path of and engage said support bracket when said puller unit is in said retracted position and thereby move said puller unit to said extended position during continued forward movement of said puller unit;

an upwardly inclined member located near said exit end and over which the outer portion of said roller rides to provide a lifting force on said roller for unlocking said puller unit from said locking bracket; and means located in the path of said roller and forward of said inclined member for engaging said roller and thereby moving said puller unit to said retracted position during continued forward movement of said puller unit.

* * * * *